(12) United States Patent
Kuwayama et al.

(10) Patent No.: US 7,113,458 B2
(45) Date of Patent: Sep. 26, 2006

(54) OPTICAL DISC APPARATUS

(75) Inventors: Yasunori Kuwayama, Daito (JP); Toshiaki Fukui, Daito (JP)

(73) Assignee: Funai Electric Co., Ltd., Daito (JP)

( * ) Notice: Subject to any disclaimer, the term of this patent is extended or adjusted under 35 U.S.C. 154(b) by 397 days.

(21) Appl. No.: 10/382,991

(22) Filed: Mar. 7, 2003

(65) Prior Publication Data

US 2003/0198149 A1    Oct. 23, 2003

(30) Foreign Application Priority Data

Mar. 8, 2002   (JP) .............................. 2002-062824

(51) Int. Cl.
G11B 7/00 (2006.01)
(52) U.S. Cl. .............................. 369/44.14; 369/44.22; 369/71
(58) Field of Classification Search ............. 369/44.21, 369/44.14, 53.13, 13.02, 13.36, 71, 72, 300, 369/44.15; 250/201.5; 15/97.1
See application file for complete search history.

(56) References Cited

U.S. PATENT DOCUMENTS 4,965,904 A * 10/1990 Tanaka et al. ............... 15/97.1
5,109,368 A * 4/1992 Ohta et al. ................ 369/44.14
5,210,735 A * 5/1993 Hoshino et al. .......... 369/53.13
5,352,881 A * 10/1994 Matsueda ................ 250/201.5

FOREIGN PATENT DOCUMENTS

| JP | 61-034735 | 2/1986 |
| JP | 62-052756 | 3/1987 |
| JP | 02-218026 | 8/1990 |
| JP | 04-302830 | * 10/1992 |
| JP | 11-203684 | 7/1999 |

OTHER PUBLICATIONS

English translation of the cited reference JP 04-302830.*

* cited by examiner

Primary Examiner—Thang V. Tran
Assistant Examiner—Kim-Kwok Chu
(74) Attorney, Agent, or Firm—Crowell & Moring LLP

(57) ABSTRACT

In an optical disc apparatus for recording and/or reproducing data on an optical disc, a lens holder for holding an objective lens is dynamically moved not only in a direction perpendicular to a data recording face of an optical disc but also in a direction parallel to the data recording face and crossing substantially at right angle with data recording tracks on the data recording face when the optical disc is loaded on the optical disc apparatus so as to remove the sticking of the movement of the objective lens due to adhesion of dust, break or deformation of the components.

8 Claims, 4 Drawing Sheets

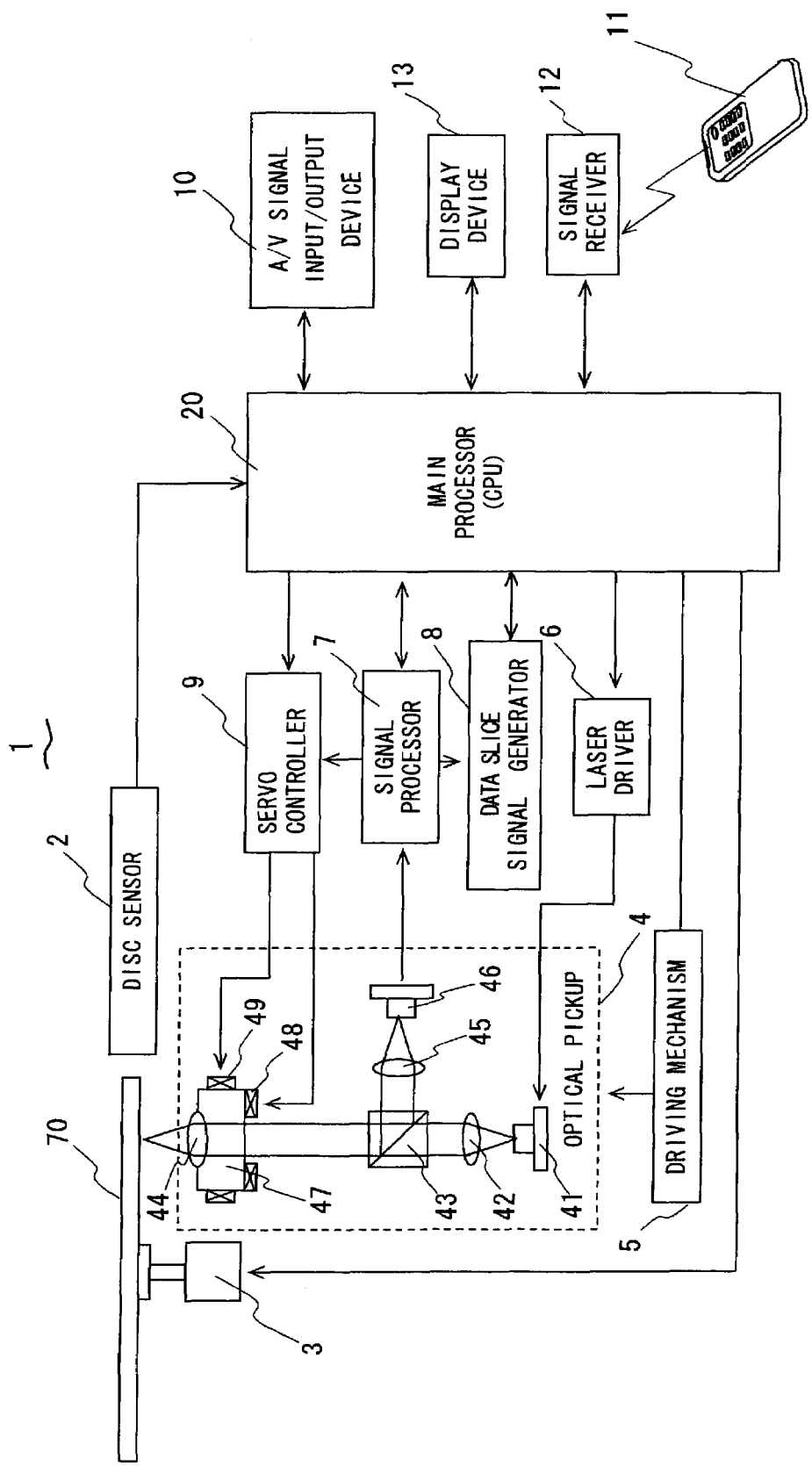

OPTICAL DISC APPARATUS

BACKGROUND OF THE INVENTION

1. Field of the Invention

The present invention relates to an optical disc apparatus for recording and/or reproducing data on an optical disc such as a CD (compact disc) or a DVD (digital versatile disc).

2. Description of the Related Art

In the optical disc apparatus, data are reproduced from the optical disc such as the CD or DVD, and the data are recorded on recordable optical disc such as a CD-R, CD-RW, DVD-R, DVD-RW, or the like by an optical head called "optical pickup". Data recording tracks are formed concentrically or spirally on such the optical disc. The optical pickup is constituted for emitting light beams such as laser beams by a laser diode, for focusing the light beams on the data recording face of the optical disc through an objective lens, for receiving a reflected light reflected from a data recording face of the optical disc and converting variation of intensity of the reflected light to electric signals by a photo-sensor and for outputting the electric signals. The optical pickup is moved in a radial direction of the optical disc.

An objective lens of the optical pickup is provided on a lens holder. The lens holder is movably borne not only in a direction perpendicular to the data recording face of the optical disc but also in a direction parallel to the data recording face of the optical disc and crossing substantially at right angle with data recording tracks on the data recording face of the optical disc.

A focusing coil and a tracking coil are provided on the lens holder further to the objective lens for moving the lens holder. The focusing coil minutely moves the objective lens on the lens holder in the direction perpendicular to the data recording face of the optical disc by electro-magnetic action with a magnet provided on a base member of the optical pickup. The tracking coil minutely moves the objective lens on the lens holder in the direction parallel to the data recording face of the optical disc, similarly to the focusing coil.

For reproducing the data from the optical disc, the objective lens of the optical pickup is moved in the direction perpendicular to the data recording face of the optical disc in a manner so that the concentration point of the focused light beam is just placed on the data recording face of the optical disc. Subsequently, the objective lens of the optical pickup is moved in the radial direction of the optical disc in a manner so that the concentration point of the focused light beam is just placed on the data recording track on the optical disc, while the concentration point of the focused light beam is placed on the data recording face of the optical disc.

Such the focusing and tracking operations of the optical pickup are executed by controlling current supplies to the focusing coil and the tracking coil corresponding to the electric signals outputted from the photo-sensor of the optical pickup. Pits formed on the data recording tracks on the optical disc are sensed from the electric signals outputted from the photo-sensor of the optical pickup, while the light beam is focused and tracked on the data recording track on the optical disc. Thus, the data are read out from the optical disc and will be reproduced.

For recording the data on the optical disc, pits corresponding to the data to be recorded are formed on the data recording tracks by concentrating the light beams pulsatively on the data recording track on the optical disc by the laser diode of the optical pickup.

In a conventional optical disc apparatus, which is, for example, shown in publication gazette of Japanese patent application 61-34735, flaw, dust, or the like on the data recording face of the optical disc is sensed for preventing occurrence of erroneous operation due to the flaw, dust or the like.

In another conventional optical disc apparatus, which is, for example, shown in publication gazette of Japanese patent application 62-52756, the decentering of the optical disc loaded on the optical disc apparatus is sensed, and the decentering of the optical disc is adjusted so as to increase the response characteristics of the tracking servo control.

In still another conventional optical disc apparatus, which is, for example, shown in publication gazette of Japanese patent application 2-218026, when the focusing servo operation of the light beam is missed, the optical pickup is once moved to depart a predetermined distance from the data recording face of the optical disc, and the objective lens is approached to the data recording face by driving the focusing actuator so as not to contact the objective lens with the optical disc even when the overdrive of the tilting servo operation occurs.

In the above-mentioned conventional optical discs, the lens holder cannot move smoothly due to sticking of the lens holder when dust is adhered in a gap between the lens holder and the sliding shaft. In such the case, the data are sometimes reproduced erroneously from the optical disc due to unsmooth movements of the focusing operation and the tracking operations.

SUMMARY OF THE INVENTION

An object of the present invention is to provide an optical disc apparatus by which sticking of the objective lens held on the lens holder due to the adhesion of dust or the like can be eliminated, and errors in the focusing operation and the tracking operation can be reduced.

An optical disc apparatus for recording and/or reproducing data on and/or from an optical disc in accordance with an aspect of the present invention comprises:

an optical pickup having a light source for emitting a light beam, an objective lens for focusing the light beam, a lens holder for holding the objective lens, a photo-sensor for receiving a reflected light from a data recording face of the optical disc, for converting variation of intensity of the reflected light to electric signals and for outputting the electric signals;

a focusing coil for displacing the objective lens held on the lens holder in a direction perpendicular to the data recording face;

a tracking coil for displacing the objective lens held on the lens holder in a direction parallel to the data recording face and crossing substantially at right angle with the data recording track; and a servo controller for driving at least one of the focusing coil and the tracking coil pulsatively so as to move the objective lens held on the lens holder dynamically prior to focusing the light beam on the data recording face for removing stick of the objective lens held on the lens holder.

By such a configuration, the objective lens held on the lens holder is dynamically moved by the focusing coil andlor the tracking coil prior to be moved for focusing the light beam on the data recording face of the optical disc. Thus, sticking of the objective lens held on the lens holder due to adhesion of dust, break or deformation of components can be removed, so that the objective lens can be moved smoothly for focusing and tracking the light beams on the data recording track on the data recording face of the optical disc. As a result, the data can be recorded or reproduced from the optical disc stably.

BRIEF DESCRIPTION OF THE DRAWINGS

FIG. 1 is a block diagram showing a constitution of an optical disc apparatus in accordance with an embodiment of the present invention;

DETAILED DESCRIPTION OF THE EMBODIMENT

Figure 2A:
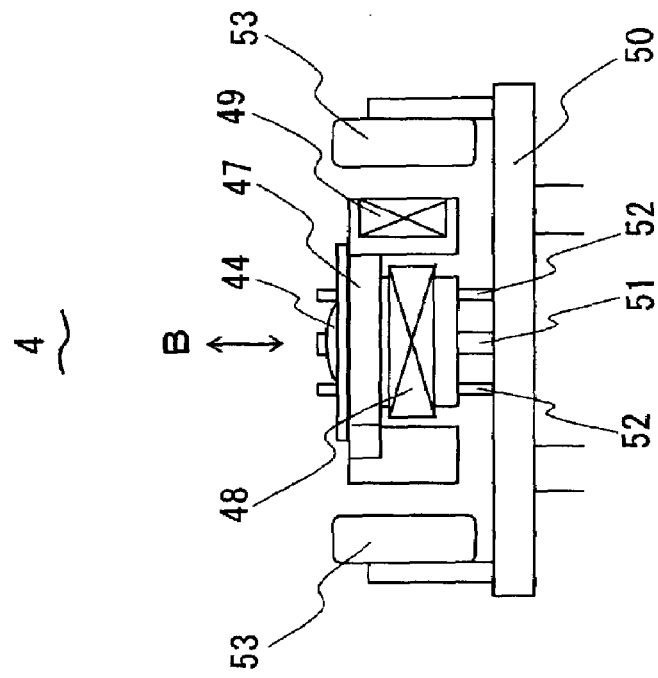
FIG. 2A is a front view for showing a configuration of an optical pickup of the optical disc apparatus in accordance with the embodiment.

An embodiment of an optical disc apparatus in accordance with the present invention is described. FIG. 1 is a block diagram showing a configuration of the optical disc apparatus in the embodiment. The optical disc apparatus 1 records and/or reproduces data such as sounds or video images on an optical disc 70 such as a CD or a DVD on which data recording tracks are formed concentrically or spirally.

The optical disc apparatus 1 comprises a disc sensor 2, a spindle motor 3, an optical pickup 4, a driving mechanism 5, a laser driver 6, a signal processor 7, a data slice signal generator 8, and a servo controller 9. The servo controller 9 serves as not only a focusing servo controller but also a tracking servo controller. The optical disc apparatus 10 further comprises an audio/visual (A/V) signal input/output device 10, a remote controller 11, a signal receiver 12, a display device 13 and a main processor 20 constituted by, for example, a ROM for memorizing an operation program, a CPU for executing the operation program, and a RAM temporality for memorizing data to be processed.

The disc sensor 2 senses whether the optical disc 70 is loaded on a tray (not shown) or not and outputs a sensing signal corresponding to the existence or nonexistence of the optical disc 70 to the main processor 20. When the optical disc 70 is loaded on the tray, the optical disc 70 will be chucked on a rotation shaft of the spindle motor 3 so as to be rotated. The rotation of the spindle motor 3 is controlled by the main processor 20.

When data are reproduced from the optical disc 70, the optical pickup 4 emits a light beam on the optical disc 70, receives a reflected light from the optical disc 70, converts the reflected light to electric signals and outputs the electric signals to the main processor 20. When data are recorded on the optical disc 70, the optical pickup 4 emits light beams pulsatively on the optical disc 70 correspondingly to the contents of the data to be recorded. The optical pickup 4 is moved in radial direction of the optical disc 70 by the driving mechanism 5 which is constituted by, for example, a linier motor. The movement of the driving mechanism 5 is controlled by the main processor 20.

The optical disc 4 comprises a laser diode (light source) 41 for emitting laser light beams, a collimator lens 42 for expanding the light beams emitted from the laser diode 41, a beam splitter 43 for transmitting and reflecting the light beams corresponding to incident direction of the light beams, and an objective lens 44 for focusing each light beam on the optical disc 70. The light beam focused on the optical disc 70 is reflected by the data recording face of the optical disc 70. The reflected light is received by a photo-sensor 46 through the objective lens 44, the beam splitter 43 and a condenser lens 45.

The emission of the light beam by the laser diode 41 is controlled by the laser driver 6 under the control of the main processor 20. The photo-sensor 46 is constituted by a photodiodes in which a photo-sensing face is divided into a plurality of areas and each area outputs electric signals corresponding to variation of intensity of received light. Output signals from the photo-sensor 46 are inputted to the signal processor 7.

Figure 2B:
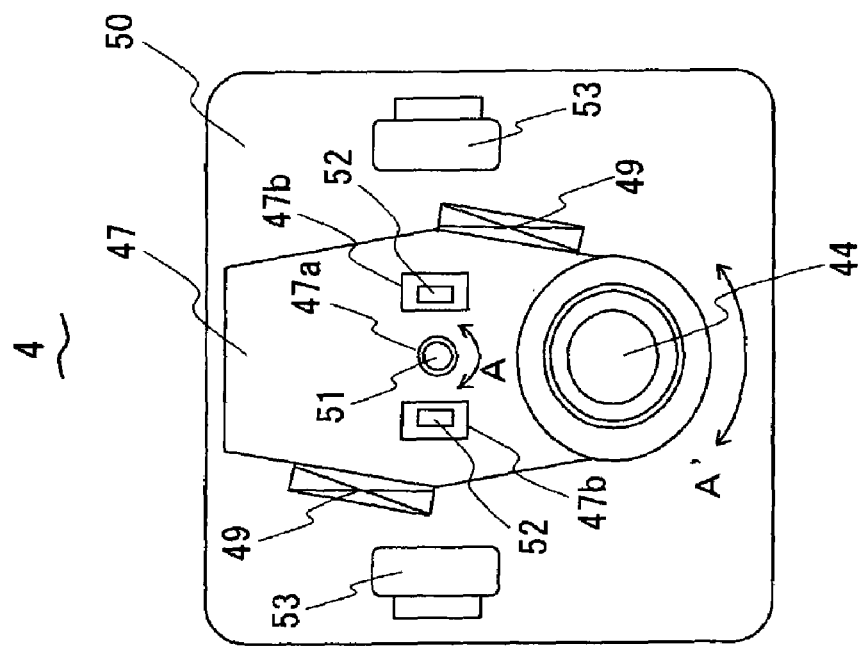
FIG. 2B is a side view of the optical pickup shown in FIG. 2A.

As can be seen from FIGS. 2A and 2B, the objective lens 44 is provided on a lens holder 47. A bearing hole 47a of the lens holder 47 is rotatably and slidably engaged with a shaft 51 provided on a base member 50 of the optical pickup 4. The lens holder 47 can be rotated around the shaft 51 as shown by arrow A in FIG. 2A. The lens holder 47 can be moved along the shaft 51 as shown by arrow B in FIG. 2B. A pair of guide holes 47b formed symmetrical to the bearing hole 47a are engaged with posts 52 provided on the base member 50 so as to be restricted the rotation angle by contacting inner walls of the guide holes 47b with the posts 52.

A focusing coil 48 and a tracking coil 49 are further provided on the lens holder 47. The focusing coil 48 minutely moves or displaces the objective lens 44 on the lens holder 47 in the direction B by electro-magnetic action with magnets 53 provided on the base member 50. The tracking coil 49 minutely rotates or displaces the lens holder 47 around the shaft 51 as shown by arrow A by electromagnetic action with magnets 53, so that the objective lens 44 on the lens holder 47 is revolved around the shaft 51 as shown by arrow A' in FIG. 2A. The laser diode 41, the beam splitter 43, the photo-sensor 46 and so on which are not illustrated in FIGS. 2A and 2B are provided on a side opposite to the objective lens 44 with respect to the base member 50.

The optical pickup 4 is mounted on the optical disc apparatus 1 in a manner so that the direction shown by arrow B is perpendicular to the data recording face of the optical disc 70, the direction shown by arrow A' is parallel to the data recording face of the optical disc 70, and the tangential of the revolution of the optical axis of the objective lens 44 crosses substantially at right angle with the data recording tracks defined on the data recording face of the optical disc 70. That is, the objective lens 44 is elevated perpendicular to the data recording face of the optical disc 70 by electromagnetic action of the focusing coil 48, and swung parallel to the data recording face of the optical disc 70 by electromagnetic action of the tracking coil 49.

The signal processor 7 generates intensity signals of reflected light (hereinafter abbreviated as RF signals) corresponding to the output signals from the photo-sensor 46, and outputs the RF signals to the data slice signal generator 8. The data slice signal generator 8 generates data slice signals by digitalizing the RF signals, and outputs the data slice signals to the main processor 20. The main processor 20 senses pits formed on the optical disc 70 based on the data slice signals.

The signal processor 7 further generates focusing error signals and tracking error signals based on the output signals from the photo-sensor 46, and outputs the focusing error signals and the tracking error signals to the servo controller 9. Each focusing error signal corresponds to a quantity of displacement of the concentration point of the light beam focused by the objective lens 44 from the data recording face of the optical disc 70. Each tracking error signal corresponds to a quantity of displacement of the concentration point of the light beam from a data recording track on the optical disc 70.

The servo controller 9 generates focusing drive signals based on the focusing error signals, and generates tracking drive signals based on the tracking error signals. The focusing drive signals are used for supplying electric current to the focusing coil 48 so as to move the objective lens 44 in the direction perpendicular to the data recording face of the optical disc 70. The tracking drive signals are used for supplying electric current to the tracking coil 49 so as to move the objective lens 44 in the direction parallel to the data recording face of the optical disc 70 and crossing substantially at right angle with the data recording tracks on the data recording face of the optical disc 70. The servo controller 9 controls to move the objective lens 44 corresponding to the focusing drive signals and the tracking drive signals, so that the concentration point of the light beam can be placed on the data recording track and on the data recording face of the optical disc 70.

External apparatus such as a monitor display apparatus, a speaker system or a TV receiver (not shown) is connected to the AV signal input/output device 10, so that not only the data reproduced from the optical disc 70 can be outputted as video images and/or sounds, but also the video signals and/or audio signals from the external apparatus can be inputted to the optical disc apparatus 1.

The remote controller 11 has a plurality of operation keys which are operated by a user for selecting a function among several operations of the optical disc apparatus 1. The remote controller 11 transmits infrared ray signals corresponding to the selection by the user. The signal receiver 12 receives the infrared ray signals from the remote controller 11, and outputs operation signals corresponding to the infrared ray signals to the main processor 20. The display device 13 is provided on a front panel of a housing of the optical disc apparatus 1, and displays the contents of the operations selected by the user through the remote controller 11, an operative condition of the optical disc apparatus 1, and so on.

Reproducing operation of the data from the optical disc 70 is described. For reproducing the data from the optical disc 70, a light beam is emitted to the data recording face of the optical disc 70 from the laser diode 41 of the optical pickup 4 and a reflected light reflected on the data recording face is received by the photo-sensor 46, while the optical disc 70 is rotated by the spindle motor 3.

The servo controller 9 generates the focusing drive signals based on the focusing error signals outputted from the signal processor 7, and controls the current supply to the focusing coil 48 for moving the objective lens 44 in the direction perpendicular to the data recording face of the optical disc 70. The servo controller 9 executes a focus search operation for searching the position of the objective lens 44 for focusing the light beam on the data recording face of the optical disc 70 based on the focusing error signal from the signal processor 7, so that the concentration point of the light beam is just placed on the data recording face of the optical disc 70 based on the focusing error signal from the signal processor 7.

Subsequently, the servo controller 9 generates the tracking drive signals based on the tracking error signals outputted from the signal processor 7, and controls the current supply to the tracking coil 49 for moving the objective lens 44 in the direction parallel to the data recording face of the optical disc 70 and crossing the data recording tracks on the data recording face of the optical disc 70, so that the concentration point of the light beam is just placed (precisely tracked) on the data recording track on the optical disc 70.

After focusing and tracking the light beam on the data recording track on the optical disc 70, the servo controller 9 generates the focusing drive signals and the tracking drive signals so as to cancel the focusing error signals and the tracking error signals, that is to reduce the displacements of the concentration point of the light beam from the data recording face and the data recording track on the optical disc 70. The servo controller 9 executes focusing servo control and tracking servo control by controlling the current supplies to the focusing coil 48 and the tracking coil 49 respectively corresponding to the focusing drive signals and the tracking drive signals so as to maintain the condition that the light beam is just focused on the data recording track on the optical disc 70.

Under such the condition, the data slice signal generator 8 generates the data slice signals by digitalizing the RF signals outputted from the signal processor 7. The main processor 20 senses the pits formed on the optical disc 70 based on the data slice signals so as to read out the data, and reproduces the data as the audio signals and/or the visual signals. The audio signals and/or the visual signals are outputted to the external apparatus through the A/V signal input/output device 10. The reproduction of the data from the optical disc 70 is executed by this manner.

Recording operation of the data on the optical disc 70 is described. For recording the data on the optical disc 70, the servo controller 9 executes the focusing servo control and the tracking servo control, firstly. Subsequently, the main processor 20 encodes the audio signals and/or the video signals inputted through the AV signal input/output device 10. The laser driver 6 controls the laser diode 41 for emitting light beams pulsatively corresponding to the encoded data by the main processor 20. Thus, the pits corresponding to the encoded data are formed on the data recording track on the optical disc 70, so that the data of video images and/or sounds are recorded on the optical disc 70. Forming of the pits on the optical disc 70 can be realized by increasing the power of the laser light beams emitted from the laser diode 41 than the power of the laser light beam when the data recorded on the optical disc 70 are reproduced.

When the remote controller 11 is operated, the optical disc apparatus 1 reproduces the data from the optical disc 70 or records the data on the optical disc 70 under the control of the main processor 20. When the optical disc 70 is loaded, the main processor 20 executes the initial reading operation for reading out the information data recorded in the innermost data recording area on the optical disc 70. Subsequently, the main processor 20 judges the kind of the optical disc 70 and the contents of the recorded data based on the information data read out from the innermost data recording area in the initial reading operation. After that, the main processor 20 controls the reading or recording the data on the optical disc 70.

The optical disc apparatus 1 executes a sticking removal operation to remove sticking of the movement of the lens holder 47 with respect to the shaft 51 or the posts 52 due to adhesion of dust, break or deformation of components, prior to the initial reading operation. In the sticking removal operation, the lens holder 47 is dynamically moved by driving the focusing coil 48 and the tracking coil 49 pulsatively.

Figure 3A:
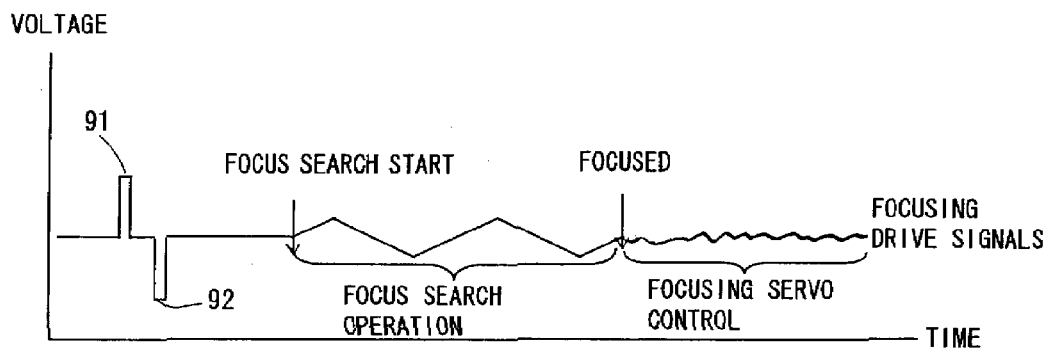
FIG. 3A is a timing chart of focusing drive signals in a sticking removal operation in the optical disc apparatus in accordance with the embodiment.

The sticking removal operation is described with reference to timing charts shown in FIGS. 3A to 3C. as shown in FIG. 3A, the servo controller 9 outputs the pulsative focusing drive signal 91 and 92 prior to start the focus search operation under the control of the main processor 20. The focusing coil 48 is dynamically driven by the pulsative focusing drive signals 91 and 92. Voltages of the pulsative focusing drive signals 91 and 92 are selected to be higher than the voltages of the focusing drive signals in the focus search operation. Thus, the focusing coil 48 is instantaneously driven by larger currents than those in the focus search operation. The lens holder 47 is quickly moved up and down in the direction perpendicular to the data recording face of the optical disc 70 by larger forces than those in the focus search operation. Thus, dynamic forces are applied to the lens holder 47, so that the dust adhered, for example, on the lens holder 47 can be removed.

Figure 3B:
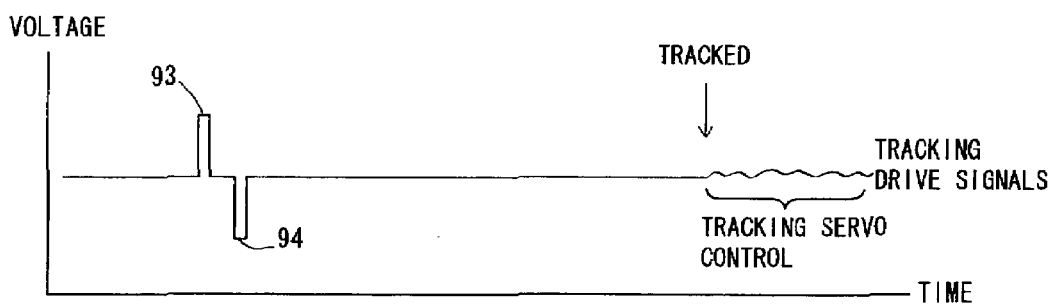
FIG. 3B is a timing chart of tracking drive signals in the sticking removal operation in the optical disc apparatus in accordance with the embodiment.

Subsequently, as shown in FIG. 3B, the servo controller 9 outputs the pulsative tracking drive signals 93 and 94 under the control of the main processor 20. The tracking coil 49 is dynamically driven by the pulsative tracking drive signals 93 and 94. Voltages of the pulsative tracking drive signals 93 and 94 are selected to be higher than the voltages of the tracking drive signals in the tracking servo control after the tracking operation. Thus, the tracking coil 49 is instantaneously driven by larger currents than those in the tracking servo control. The lens holder 47 is quickly moved reciprocally in the direction parallel to the data recording face of the optical disc 70 and crossing substantially at right angle with the data recording tracks on the data recording face of the optical disc 70 by larger forces than those in the tracking servo control. Thus, dynamic forces are applied to the lens holder 47, so that the dust adhered on the lens holder 47 can be removed. The focusing coil 48 and the tracking coil 49 are alternately driven by the pulsative driving signals.

After the sticking removal operation, as shown in FIG. 3A, the servo controller 9 outputs the triangular wave focusing drive signals under the control of the main processor 20. The lens holder 47 is moved up and down in the direction perpendicular to the data recording face of the optical disc 70 SO as to start the focus search operation. The light beam emitted from the laser diode 41 is just focused on the data recording face of the optical disc 70 by the objective lens 44. When the light beam is focused on the data recording face of the optical disc 70, the servo controller 9 outputs the focusing drive signals for executing the focusing servo control, as shown in FIG. 3A.

Figure 3C:
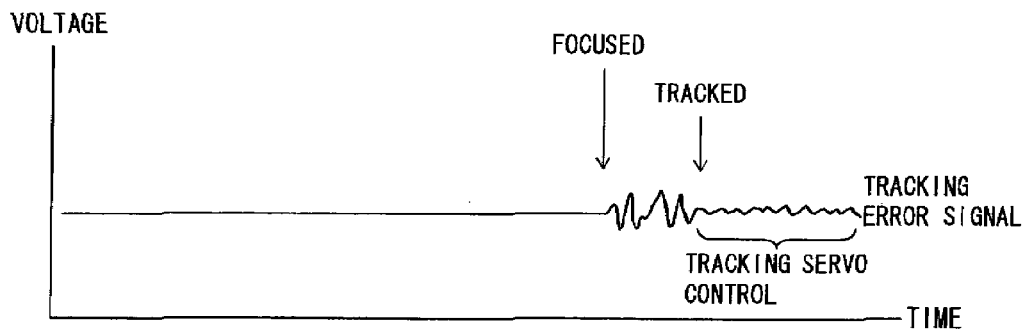
FIG. 3C is a timing chart of tracking error signals in the optical disc apparatus in accordance with the embodiment.

After focusing the light beam on the data recording face of the optical disc 70, the signal processor 7 outputs the tracking error signals, as shown in FIG. 3C. The servo controller 9 generates the tracking drive signals based on the tracking error signals, as shown in FIG. 3B. The lens holder 47 is moved in the direction parallel to the data recording face of the optical disc 70 and crossing substantially at right angle with the data recording tracks on the data recording face of the optical disc 70 so as to track the focused light beam on a desired data recording track. Furthermore, the servo controller 9 executes the tracking servo control so as to maintain the focused and tracked condition of the light beam. The main processor 20 reads out the data from the optical disc 70 while the tracking servo control is executed.

Figure 4:
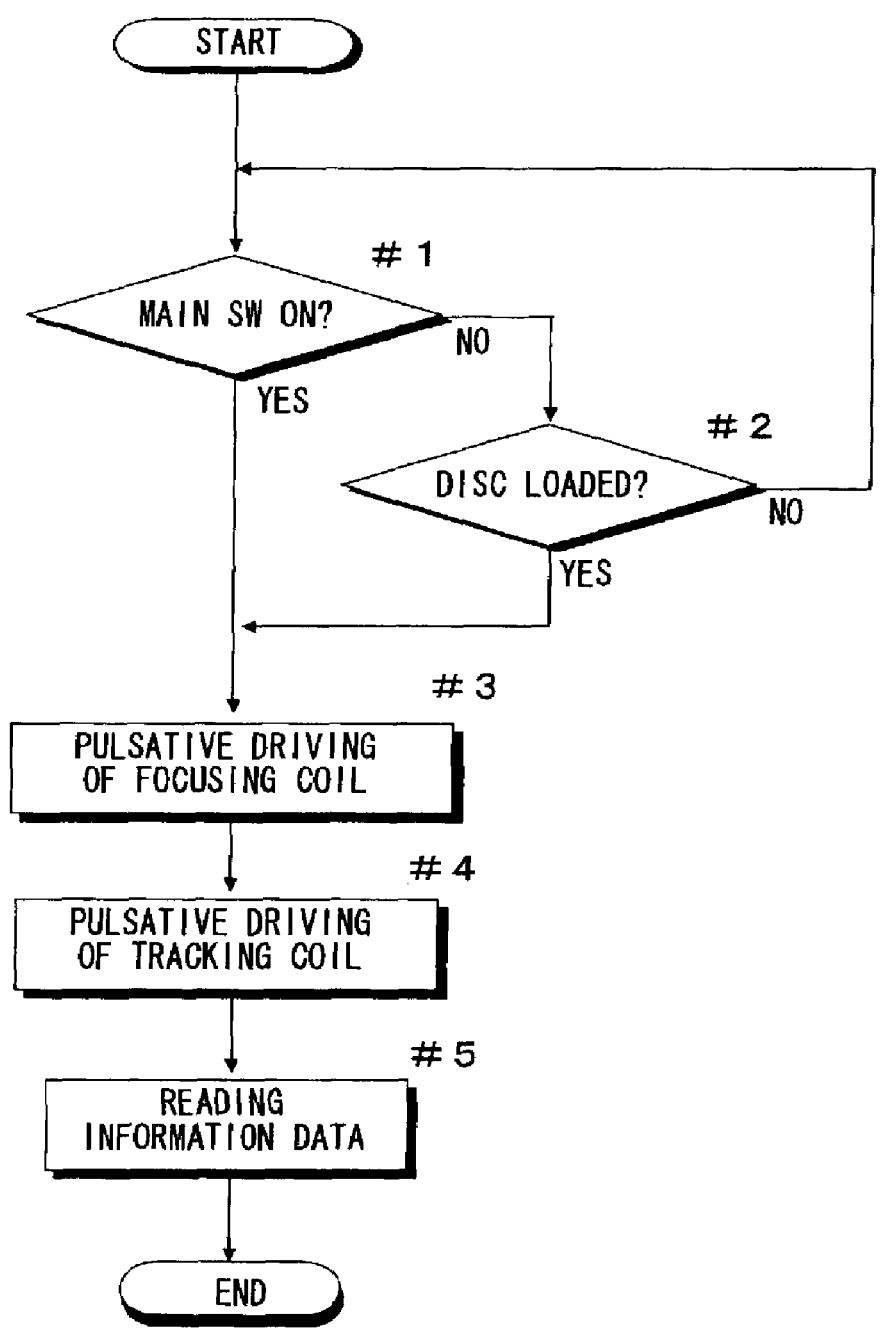
FIG. 4 is a flowchart for showing the operations of the optical disc apparatus in accordance with the embodiment.

Operations of the optical disc apparatus 1 in accordance with the embodiment is described with reference a flowchart shown in FIG. 4.

The main processor 20 judges whether the main switch (SW) of the optical disc apparatus 1 is turned on or not (#1). When the main switch is not turned on (NO in step #1), the main processor 20 further judges whether the optical disc 70 is loaded or not (#2).

When the main switch is turned on (YES in step #1) or when the optical disc 70 is loaded (YES in step #2), the main processor 20 starts the sticking removal operation to remove the sticking of the lens holder 47. The servo controller 9 pulsatively drives the focusing coil 48 (#3), and further pulsatively drives the tracking coil 49 (#4). The main controller 20 repeats the driving of the focusing coil 48 and the tracking coil 49 alternately at predetermined times.

After finishing the sticking removal operation by driving the focusing coil 48 and the tracking coil 49 pulsatively, the main controller 20 executes the initial operation. The servo controller 9 drives the focusing coil 48 and the tracking coil 49 for focusing and tracking the light beam on the data recording face of the optical disc 70, so that the information data recorded in the innermost data recording area on the optical disc can be read out (#5).

In the above-mentioned optical disc apparatus 1, when the main switch of the optical disc apparatus 1 is turned on or when the optical disc 70 is loaded, the focusing coil 48 and the tracking coil 49 are pulsatively driven, so that the lens holder 47 holding the objective lens 44 is dynamically moved. As a result, the stick of the lens holder 47 due to the dust adhered between the bearing hole 47 of the lens holder 47 and the shaft 51 on the base member 50 and/or between the guide holes 47b of the lens holder 47 and the posts 52, or due to the break or deformation of there components can be removed, so that the lens holder 47 can smoothly be moved in the data recording or reproducing operation.

The present invention is not restricted by the above-mentioned embodiment and can be modified in several manners. It is possible to execute the stick removing operation for removing the stick of the lens holder 47 at any time when the user operates the remote controller 11 for recording or reproducing the data on the optical disc 70, or the like, further to the timing when the main switch of the optical disc apparatus 1 is turned on or when the optical disc 70 is loaded. It is possible to repeat the pulsative driving of the focusing coil 48 and the tracking coil 49 at several times.

This application is based on Japanese patent application 2002-62824 filed in Japan dated Mar. 8, 2002, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disc apparatus for reading and/or reproducing data on and/or from an optical disc comprising:
   an optical pickup having a light source for emitting a light beam, an objective lens for focusing the light beam, a lens holder holding the objective lens, a photo-sensor for receiving a reflected light from a data recording face of the optical disc, converting variation of intensity of the reflected light to electric signals and outputting the electric signals;

a focusing coil for displacing the lens holder with the objective lens in a direction perpendicular to the data recording face;

a tracking coil for displacing the lens holder with the objective in a direction parallel to the data recording face and crossing substantially at right angle with the data recording track; and a servo controller for driving at least one of the focusing coil and the tracking coil pulsatively so as to move the lens holder with the objective lens dynamically, prior to focusing the light beam on the data recording face, for removing dust adhered between the lens holder and a shaft on a base member of the optical pickup at any time when a user operates a remote controller for recording or reproducing data on the optical disc, and further at a time when a main switch of the optical disc apparatus is turned on or when an optical disc is loaded.

2. The optical disc apparatus in accordance with claim 1, wherein
the focusing coil and the tracking coil are alternately driven at predetermined times.

3. The optical disc apparatus in accordance with claim 2, wherein
the servo controller supplies pulsative drive signals to the focusing coil and/or the tracking coil.

4. The optical disc apparatus in accordance with claim 3, wherein
voltages of the pulsative drive signals are higher than voltages of drive signals for driving at least one of the focusing coil and the tracking coil when the light beam is focused or tracked.

5. The optical disc apparatus in accordance with claim 1, wherein
the servo controller drives at least one of the focusing coil and the tracking coil dynamically when the optical disc is loaded on the optical disc apparatus.

6. The optical disc apparatus in accordance with claim 1, wherein
the servo controller drives at least one of the focusing coil and the tracking coil dynamically when a main switch of the optical disc apparatus is turned on.

7. The optical disc apparatus in accordance with claim 1, wherein
the servo controller drives at least one of the focusing coil and the tracking coil dynamically while an initial operation for reading information data from the innermost data recording area on the data recording face of the optical disc.

8. The optical disc apparatus in accordance with claim 1, wherein
the focusing coil and the tracking coil are provided on the lens holder of the optical pickup.

* * * * *